United States Patent [19]

Barnes

[11] 4,374,631
[45] Feb. 22, 1983

[54] WINDMILL SPEED LIMITING SYSTEM UTILIZING HYSTERESIS

[75] Inventor: Dale R. Barnes, Kersey, Pa.

[73] Assignee: Fayette Manufacturing Corporation, Clearfield, Pa.

[21] Appl. No.: 265,839

[22] Filed: May 21, 1981

[51] Int. Cl.³ ............................................. F03D 7/04
[52] U.S. Cl. ..................................... 416/23; 416/44; 416/89
[58] Field of Search .................. 416/132 B, 43, 89 A, 416/23, 44 A, 51 A, 52 A, 89 R, 139 A

[56] References Cited

U.S. PATENT DOCUMENTS

| | | | |
|---|---|---|---|
| 932,521 | 8/1909 | Wallace | 416/132 B |
| 1,757,667 | 5/1930 | Hesse | 416/89 A |
| 2,029,503 | 2/1936 | Peterson | 416/89 A |
| 2,037,528 | 4/1936 | Miller | 416/23 |
| 2,052,454 | 8/1936 | Ellwood et al. | 416/89 A |
| 2,058,500 | 10/1936 | Plucker | 416/23 X |
| 2,074,149 | 3/1937 | Jacobs | 416/23 X |
| 2,117,788 | 5/1938 | Cable et al. | 416/89 A X |
| 2,126,202 | 8/1938 | McColly | 416/41 A X |
| 2,152,984 | 4/1939 | Wilford | 416/24 |
| 2,437,659 | 3/1948 | Albers | 416/23 X |
| 3,215,370 | 11/1965 | Strydom | 416/23 X |
| 4,257,736 | 3/1981 | Jacobs | 416/51 A |
| 4,297,076 | 10/1981 | Donham et al. | 416/41 A |

FOREIGN PATENT DOCUMENTS

| | | | |
|---|---|---|---|
| 612675 | 5/1935 | Fed. Rep. of Germany | 416/23 |
| 917540 | 9/1954 | Fed. Rep. of Germany | 416/132 B |
| 704045 | 5/1931 | France | 416/23 |
| 55893 | 9/1952 | France | 416/132 B |
| 22407 | 12/1930 | Netherlands | 416/132 B |
| 578676 | 7/1946 | United Kingdom | 416/132 B |

Primary Examiner—Everette A. Powell, Jr.
Attorney, Agent, or Firm—Oblon, Fisher, Spivak, McClelland & Maier

[57] ABSTRACT

A windmill speed limiting device is provided to prevent the windmill blades from going too fast during conditions of heavy winds. In order to slow down the windmill blades, the tips of the blades are turned relative to the main blade portion at high speeds. After the tips are turned, the windmill blade must return to a safe speed before the tips are returned to their normal position. A hysteresis effect by which the tip portions are rotated to their normal angular position in alignment with the main blade portion is implemented by means of a cam track, a pivot point below the center of the blade and a central spring loaded drum to which each of the blades are connected.

4 Claims, 8 Drawing Figures

WINDMILL SPEED LIMITING SYSTEM UTILIZING HYSTERESIS

BACKGROUND OF THE INVENTION

1. Field of the Invention

This invention relates generally to a speed limiting system for a windmill and more particularly to a speed limiting system utilizing a hysteresis effect to prevent the return of the system to its normal status until wind conditions have abated.

2. Description of the Prior Art

The use of windmills as a source of energy has been known for a long time. In recent years, due to the energy crisis there has been much renewed interest in this free energy source. However, several problems exist which prevent the windmill from becoming an effective energy source. One problem long recognized in the art is the effect of high winds, such as is found in gales and storms, on the blades and other equipment of the windmill. As the winds increase in velocity, the blades turn at a high rate of speed to the point that damage may be done to the equipment. Similarly, when electrical generators or other equipment driven by the windmill require a constant speed to operate at maximum capacity, even lesser winds may cause the equipment to operate at less than maximum capacity. Hence, it is necessary to limit the speed of the blades even though the point of damage has not been reached. Over the years, various adjusting mechanisms have been developed to counteract this effect. However, these various devices generally have not been satisfactory, due to their complex nature, their unreliability and their high degree of maintenance.

One known method of combating the problem has been to change the angle of the blades so that the high velocity winds are not able to change most of their energy into the rotational energy of the windmill. One early example of this type of device is shown in U.S. Pat. No. 26,345. The blades in this device are connected together in four groups. Each group contains an arm having a slide attached thereto. As the windmill turns faster due to the increasing velocity of the wind, the slide is hurled outwardly along the arm due to centrifugal force. However, each slide is connected to a central portion of the wheel by means of a rod. The rods are connected to a central cylinder which is springloaded. As the slides move outwardly, the rods pull the cylinder in a circular fashion and cause the blades of the windmill to present a larger surface to the incoming wind. Hence, the force of the wind no longer drives the windmill efficiently and the wheel slows down, thus avoiding damage.

Many similar solutions to this problem have been presented, which act to turn the blades of the windmill or in some other manner brake the blades. U.S. Pat. No. 2,058,500 shows such an arrangement where a part of the blade is rotated in relation to the main part of the blade so as to be almost perpendicular to the direction of travel of the blade and hence create more resistance to the movement of air. This effectively slows down the blade and avoids damage. The sideways movement of the blade tip is created when centrifugal force acts on the tip and forces it outwardly. Since the tip is mounted on a pin which has limited movement within an inclined slot, the outward movement of the blade tip also creates a sideways movement bringing the tip to a direction perpendicular to that of the blade.

A similar device is shown in U.S. Pat. No. 2,037,528, wherein the blade tips are again turned to act as a brake. In this device, the centrifugal force of the blade tip forces a spiral strap through a nut and thus causes a twisting motion as the blade tip moves outwardly under centrifugal force. The sideways movement of the blade acts as a brake for the windmill.

While these and other similar devices are somewhat effective in alleviating the effects of strong winds, there are still certain disadvantages which exist. When conventional devices are used, the blade or blade tips return to their original position as soon as the windmill decreases in speed. Thus, during a storm, when it would be desirable to have the windmill move at minimum speed, it nevertheless only slows down slightly before the brake is released and the windmill is allowed to speed up again. This cyclical fast and slow motion somewhat averages out but still allows the windmill to move faster than desired. An additional problem is that if the braking action is not applied simultaneously to all of the blades, there is an uneven force being applied to the windmill. This may result in damage to the faster moving blade or may create vibrations through the mill mechanism which may damage other parts. Also, there is no provision for allowing minor wind gusts to turn the blades without braking.

SUMMARY OF THE INVENTION

Accordingly, one object of this invention is to provide a novel speed limiting system for a windmill which is capable of reliable operation under adverse conditions.

Another object of this invention is to provide a speed limiting system for a windmill which utilizes a hysteresis effect so that the braking action of the windmill is not relieved until the adverse conditions are concluded.

A further object of the invention is to provide a speed limiting system where all the blades of the windmill are braked to the same extent.

Another object of the invention is to provide a speed limiting system for a windmill where the blade tips act as the brakes.

A still further object of the invention is to provide a speed limiting system for a windmill which will not actuate the braking action under small gusts of wind, but rather only react to large winds.

These and other objects of the present invention are achieved by providing a speed limiting system which utilizes the blade tips as brakes by rotating the tips so that they act as a resistance to the wind. Each of the blade tips is connected to a central drum by means of a cable which is spring loaded, so that each blade receives the same braking action. A cam track allows minor axial movements of the blade tip without rotation to accommodate small gusts of wind which do not require a braking action. The pivot point of the tip is placed so that when actuated, the tips will be maintained in their actuated position by the off-center nature of the pivot.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
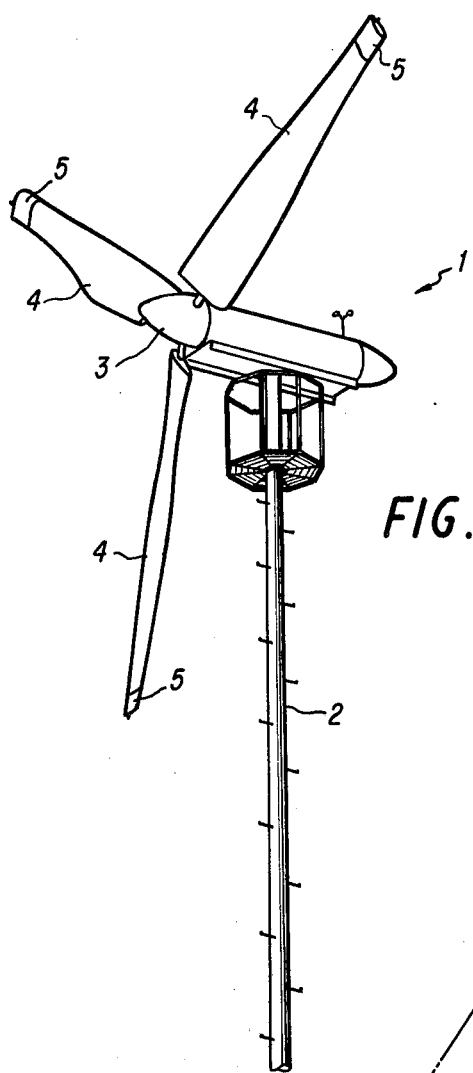
FIG. 1 is a drawing of the overall invention.

Referring now to the drawings wherein like reference numerals designate identical or corresponding parts throughout the several views, and more particularly to FIG. 1 thereof wherein the overall arrangement of the windmill and its speed limiting system 1 is shown as including a windmill tower 2 for supporting to a hub arrangement 3, and three blades 4, each containing a blade tip portion 5. Each of the blades is fixedly connected to the hub 3 and rotate therewith. The hub is connected to a shaft and bearing arrangement, not shown, which rests on top of the windmill support 2. When the wind blows against the windmill blades, the hub and blades rotate and may be used to drive an electrical generator, not shown, to generate electricity. When the force of the wind is too great and the blades rotate too fast, the blade tips rotate so that they act as a brake.

Figure 2:
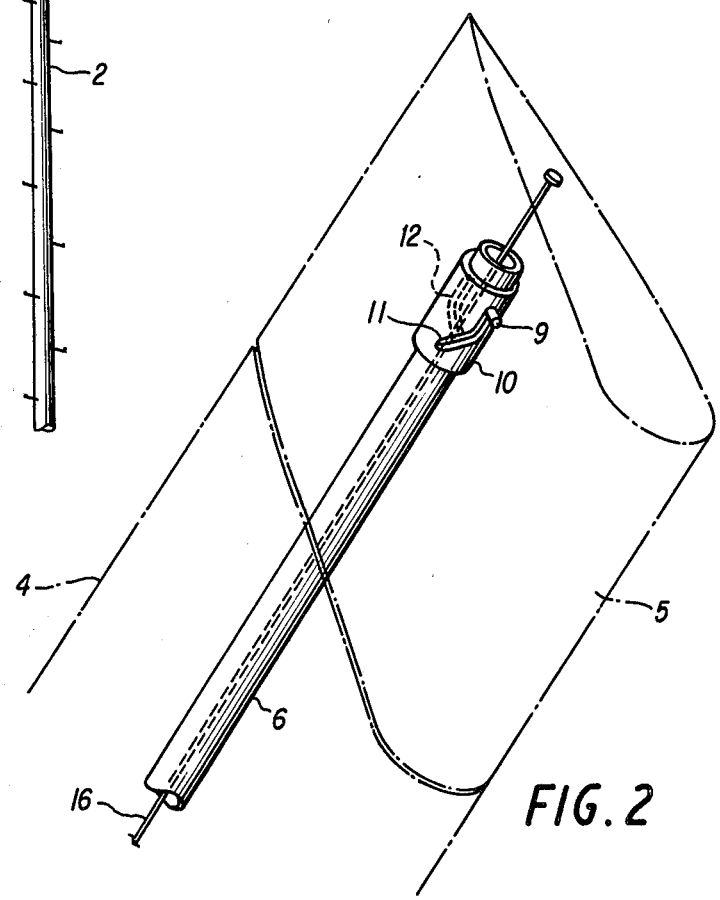
FIG. 2 is a schematic diagram of the blade and blade tip of the present invention.

As is more clearly shown in FIG. 2, blade 4 contains a hollow shaft 6 which is mounted securely inside the blade and extends parallel to the axis of the blade. The end of the shaft extends into the blade tip in a similar manner, but is not attached thereto. At a point inside the blade tip, two diametrically opposed holes are drilled in the shaft and a cam follower 9 is firmly secured therethrough. The blade tip 5 carries a cam track bushing 10 which is firmly attached thereto, such as by welding. Two curved slots are provided in the wall of the bushing and form cam tracks 11, 12. The tracks are each formed in two sections, an upper section which extends in the axial direction and a lower section which extends axially and circumferentially around the bushing. Cam follower 9 extends through the tracks 11, 12 and is movable therein. The cam track bushing 10 has an inside diameter slightly larger than the outside diameter of shaft 6 and fits loosely around the shaft 6. The bushing may move about the shaft which is rigidly fixed as limited by the cam follower and cam track. A rod or cable 16 extends through the shaft 6 and is attached to the blade tip 5 in some manner. A preferred method is to attach the rod to a cap, not shown, provided over the bushing, but it may be attached to any portion of the blade tip. The rod extends down the shaft to the center of the windmill.

Figure 3A:
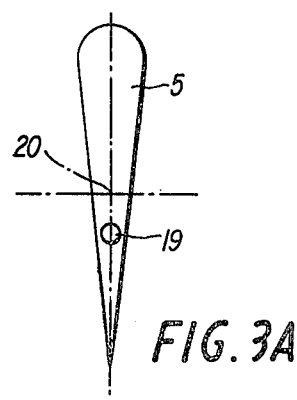
FIGS. 3A and 3B are schematic diagrams illustrating the normal orientation and the actuated orientation of the blade tip.
Figure 3B:
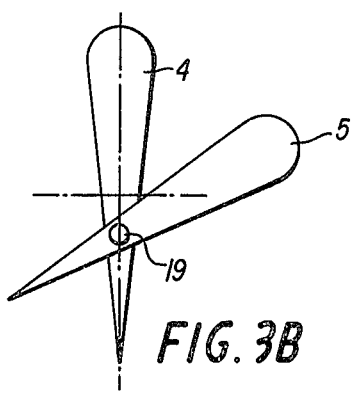

FIGS. 3A and 3B show the pivoting action of the blade tip, as viewed from the end of the blade. The pivot point 19 is indicated as being below the center of the blade. The center point 20 is marked by the intersection of the two center lines. In FIG. 3B the movement of the blade tip, when actuated, is shown. The tip moves about the pivot point 19 some 60°-70° so as to present a large surface area in the direction of the rotational movement of the blade.

Figure 4:
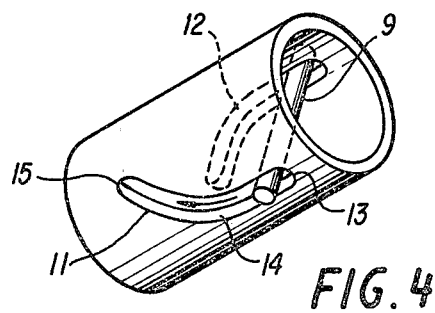
FIG. 4 is a schematic diagram of the cam track bushing utilized in the present invention.

FIG. 4 shows more clearly the cam follower 9 and cam track bushing 10 which were described in FIG. 2. Here, the relationship of the cam follower 9 and the cam tracks 11 and 12 can more easily be seen with the other parts of the mechanism removed. The cam tracks extend on the wall of the bushing in opposite circumferential directions. Thus, as the cam follower moves in the tracks, only axial and rotational movement is produced in the bushing.

Figure 5A:
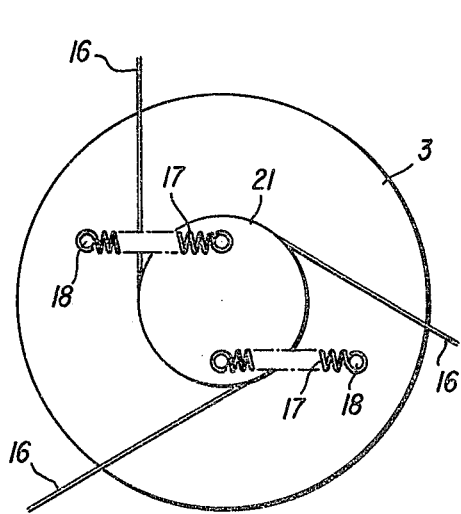
FIGS. 5A, 5B and 5C are schematic diagrams illustrating the normal condition and the actuated condition of the central drum.
Figure 5B:
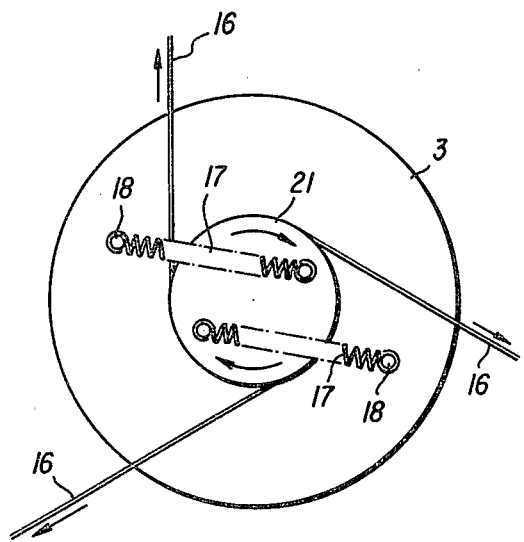

FIGS. 5A and 5B show the connection of the rods 16 from the different blades to the central hub apparatus. Each of the rods is pivotally connected to the periphery of a drum 21 which is mounted on hub 3. The drum 21 is coaxial with the hub 3 and mounted so that the drum may rotate about its center in relation to the hub a portion of one turn. A shaft, pin or similar device may be used to connect the hub and drum at their centers as long as at least one is loosely connected thereto. It is also possible to connect both the hub and drum connected to a drive shaft which is used to power the generator. In this case, the hub is rigidly mounted while the drum is loosely mounted. In addition to the relative rotation between the hub and drum, the hub and drum rotate with the blades and rods around their axis due to the driving force of the winds against the blades. Since the blades are rigidly mounted on the hub, the hub is directly driven. The drum is driven at the same rotational speed due to the rods which are connected to the blades and the drum and move at the same rotational speed as the hub. Further, the drum is spring loaded by springs 17 which are connected at one end to the drum and at the other end to the hub. The drum and hub are held together by springs 17 and aid in keeping the rotational movement of both elements equal. Normally, the springs are essentially unextended, as shown in FIG. 5A. However, in the actuated position, the drum rotates part of one turn in relation to the hub, and the springs are extended, as shown in FIG. 5B. In either position, the hub and drum are moving rotationally at the same speed, with the blades and rods. As mentioned above, the rods are connected to the periphery of the drum. Any pulling forces on the rods are transferred to the rotational movement of the drum 21, in opposition to the springs 17, which tend to hold the drum in the unactuated position. Hence, when the pull on rods 16 is stronger than the pull of the springs, the drum will rotate a portion of one turn to the actuated position shown in FIG. 5B.

Figure 5C:
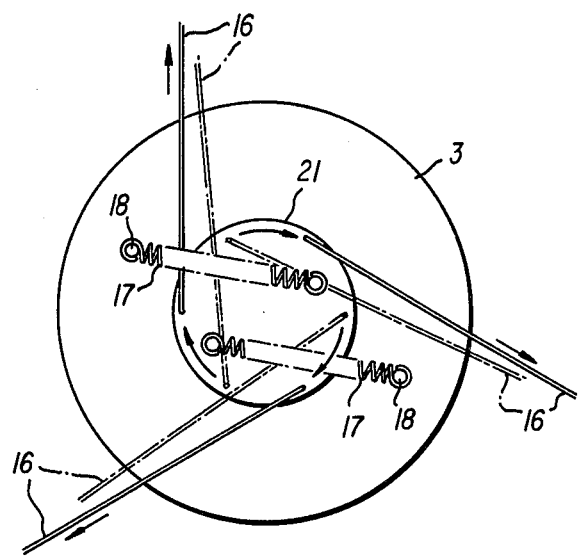

FIG. 5C shows a second embodiment where the rods are connected to the drum at a point other than the periphery. In the position shown in phantom the rod does not pull in the direction of the tangent of the drum. However, when actuated, as shown in solid, the drum rotates and the rod pulls in the direction of the tangent similar to the manner shown in FIG. 5B. Since the angle of the rod changes with respect to the drum, a pivotal connection 22 is used to connect the rod to the drum.

In normal operation, the blades of the windmill are forced in a circular motion about the central hub by the force of the wind. As the blades move, centrifugal force is generated on the blade tips. This force is carried by the rods to the central hub where the drum is located. Since each of the rods is connected to the drum 21, the centrifugal force acting on the blades is averaged and the forces on the blades become equal. At normal operating speeds, the springs connected to the drum exert enough force to keep the rods from extending and allowing the blade tips to extend outwardly. With an increase in wind velocity, the blades move faster and the blade tips pull harder on the rods. Opposed by the strength of the springs, the rod will move outwardly slightly, allowing the blade tips to also move outwardly. The position of the blade tips is controlled by the cam follower moving within the cam track. As the tip moves outwardly, cam follower 9 moves axially from point 13 to point 14 on the first section of the track. Thus, the blade tip remains in its normal orientation even though it moves outwardly to a small degree. At this point, the springs exert enough torque to return the blade tip when the wind slows down. Similarly, since the tip has not been turned to any degree, the force of the wind on the tip is not unbalanced and does not act to cause any turning. Similarly, the cam follower may move directly backwards from point 14 to point 13 as the wind velocity subsides. Hence, it is seen that as long as the force of the wind is not too great, no turning action is formed on the tip and all effects of the mechanism are completely reversable. This action allows the device to handle mirror gusts of wind without causing a braking action. The distance between points 13 and 14 and the spring constant of the springs will determine the speed at which the tips are turned and the braking action actuated.

In the case of a storm or other high winds, the speed of the windmill may increase with an even greater effect and the braking action will not be reversable by a mere return to lesser speeds. Further, a hysteresis effect is created so that it will be necessary for the speed of the windmill to drop to a speed below that required for actuation before the brakes are released. This prevents the possibility of a cyclical on and off braking action with possible resultant damage to the equipment. Once these high winds are encountered, the brakes are applied fully and are not released until the storm has completely abated and the safe operation of the windmill is assured.

Under storm conditions, the blades of the windmill increase in velocity and the centrifugal force on the blade tips increase, pulling harder on the rods. As the rods are pulled and the drum is turned, the springs attached to the drums are expanded. However, since one end of the spring is connected to the turning drum, the angle at which the force of the spring is applied changes. The force of the springs is exerted against the drum at an angle almost perpendicular to the tangent of the drum resulting in a decrease in the torque arm between the spring and the drum. Thus, the torque exerted is actually minimized even though the force of the spring is increased. In other words, the spring is pulling almost directly across the diameter of the drum rather than at a tangent to the periphery. Hence, the force of the spring is not directed to cause a rotational motion, but rather pulls in a sideways direction without much effect. Hence, once a certain force on the rod is reached the effect of the springs is lessened and the drum will not return under the force of the springs until the winds are considerably lessened. Hence, the hysteresis effect is partly enabled by this mechanism.

Under the same conditions, the embodiment of FIG. 5C produces a similar action, but with an additional hysteresis effect. In the unactuated position, the rod pulls the drum at an angle to the tangent and hence the torque applied is less than the torque that is applied when pulling in the tangent direction, such as happens in the actuated position. Hence, the torque applied to the drum from the rod is maximized in the actuated position and minimized in the unactuated position. Thus, an additional hysteresis action is effected to aid the hysteresis action described in the previous embodiment.

Further, under storm conditions, as the centrifugal force of the blade tips increases and the cables move outwardly, the cam follower 9 moves from point 13 to point 14, allowing the blade tip to move outwardly without changing its orientation. As the blade continues to increase in speed, the cam follower then axially and circumferentially follows the track from point 14 to point 15 causing the blade tip to rotate while it moves outwardly. The angle of the incline of this section determines the rate at which the tip rotates compared to the axial extension. As the blade tip rotates, the rotational wind catches the side of the blade tip, forcing it to the full actuated position shown in FIG. 3B. When in this position it acts to brake the windmill and slow it down. Since the force of the wind acts to keep the tip in the actuated position and since the pull on the drum has been lessened by the turning of the drum, the forces acting to return the tip to the normal orientation have been reduced and the brakes will remain fully actuated until the winds have completely abated. While the cam follower is not prevented from returning to point 14 and then to point 13, there is not enough torque on the drum and hence pull on the rod 16 to overcome the force of the wind acting on the unbalanced tip. Hence, the tip will remain actuated until the speed of the windmill has been substantially reduced.

As the winds die down, the blades will move slower, causing less centrifugal force and less pull on rod 16. Further, as the blades slow down, the rotational wind forces against the brake will also subside. When both of these effects diminish due to the cessation of the wind, the torque on the drum caused by the expanded springs will then be stronger than these forces and cause the return of the drum to the normal position, thus pulling the rods back in and pulling cam follower 9 back to positions 14 and 13, respectively, with the resultant return of the tip to its normal position. However, it will be appreciated that the return of the system to its normal position will require a speed less than that used to actuate it initially. Hence, once the storm hits, the full braking action will continue until the high winds are completely abated and a speed is reached which is lower than that of merely normal high winds. As a result, the windmill equipment is protected during wind storms thus preventing expensive repairs.

The windmill shown in the drawings contains three blades. It is clear that the same mechanism will be operable no matter how many blades are included in the windmill structure. Similarly, the size of the blade tip in relation to the blade itself could be any reasonable size up to 50%, however, best results are obtained when the blade tip constitutes 10 to 15% of the blade surface area. The angle at which the blade tip moves with respect to the main portion of the blade may be any angle up to 90°. However, the use of a 60° to 70° angle has been found to be most useful. Clearly, the angle is controlled by the angular distance between points 14 and 15 on the cam track. While two springs have been shown as controlling the movement of the drum, clearly any number of springs would be workable. It is even possible to have only a single spring, as long as it is able to generate the required force.

Other changes will be obvious to people most familiar with the windmill art, for example, it would be possible to place the bushing in the main part of the blade and have the cam follower mounted on the blade tip. In this embodiment, the cam track bushing will take an inverted position from that shown in the drawings.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A speed limiting system for a windmill, comprising:
   a hub mounted for rotational movement;
   a plurality of blades attached to said hub, each blade including a main blade portion and a rotatable blade tip portion;
   a plurality of rods for coupling respective blade tip portions to said drum;
   each blade tip portion containing a cam track bushing and a cam follower and coupled to a respective one thereof for imparting rotational movement to the respective blade tip portion in relation to the respective main blade portion, said cam track pushing including at least one cam track for receiving said cam follower and allowing relative movement therein, said cam track including a first track section extending axially with respect to the respective blade and a second track section extending both axially and circumferentially with respect to the respective blade;
   a drum rotatably coupled to said hub;
   bias means coupling said drum and said hub for producing a force opposing relative rotation therebetween, said bias means coupled to said drum with a initial torque arm determined by the initial positioning of said cam follower in said first track section of said cam track bushing and coupled to said drum at a second torque arm less than first torque arm when said cam follower completely transverses said second cam track section;
   wherein blade rotation results in a centrifugal force being applied to said drum in opposition to the force produced by said bias means, such that as blade rotation speed increases, the torque on said drum produced by the centrifugal force eventually exceeds that produced by the bias means, resulting in rotation of the drum and travel of said cam follower within said cam track, said blade tip portion correspondingly undergoing axial and then also rotational and axial movement as said cam follower traverses said cam track with increasing speed, each blade tip portion remaining rotated upon transversing said second track section until the blade rotation speed decreases to a point where the torque on the drum produced by the bias force exceeds that produced by the centrifugal force, whereby a hysterisis effect is achieved.

2. A speed limiting system according to claim 1, comprising:
   said cam track in said cam track bushing defining a circumferential turn of less than 90°.

3. A speed limiting system according to claim 2, comprising:
   said cam track of said cam track bushing defining a circumferential turn between 60°–70°.

4. A speed limiting system according to claim 1, wherein said bias means comprises: at least one spring.

* * * * *